United States Patent
Su

(10) Patent No.: US 11,971,122 B2
(45) Date of Patent: Apr. 30, 2024

(54) MULTI-DIAMETER CLIPPING MECHANISM

(71) Applicant: Chien-Chung Su, Taichung (TW)

(72) Inventor: Chien-Chung Su, Taichung (TW)

( * ) Notice: Subject to any disclaimer, the term of this patent is extended or adjusted under 35 U.S.C. 154(b) by 0 days.

(21) Appl. No.: 18/297,873

(22) Filed: Apr. 10, 2023

(65) Prior Publication Data

US 2023/0332719 A1    Oct. 19, 2023

(30) Foreign Application Priority Data

Apr. 15, 2022  (TW) .................................. 111114490

(51) Int. Cl.
*F16L 3/10* (2006.01)
*A61J 15/00* (2006.01)
*F16L 3/202* (2006.01)

(52) U.S. Cl.
CPC ......... *F16L 3/1075* (2013.01); *A61J 15/0061* (2013.01); *F16L 3/202* (2013.01)

(58) Field of Classification Search
CPC . F16L 3/1075; F16L 3/202; F16L 3/23; F16L 3/1041; F16L 3/2334; F16L 3/2332; F16L 3/2336; A61J 15/0061; A61J 15/0053; A61J 15/0003
USPC ............... 248/74.1; 24/134 L, 132 WL, 272, 24/132 R, 484; 604/180
See application file for complete search history.

(56) References Cited

U.S. PATENT DOCUMENTS

| | | | | |
|---|---|---|---|---|
| 4,711,636 A | * | 12/1987 | Bierman | A61M 25/02 128/DIG. 26 |
| 4,932,943 A | * | 6/1990 | Nowak | A61M 25/02 604/178 |
| 4,986,815 A | * | 1/1991 | Schneider | A61M 25/02 604/178 |
| 5,944,696 A | * | 8/1999 | Bayless | A61M 25/02 604/174 |
| 6,101,684 A | * | 8/2000 | Ginocchio | F16L 3/23 24/270 |

(Continued)

FOREIGN PATENT DOCUMENTS

TW          202034889 A     10/2020

OTHER PUBLICATIONS

Search Report of TW111114490, dated Apr. 15, 2022, 2 pages.

*Primary Examiner* — Christopher Garft
(74) *Attorney, Agent, or Firm* — Muncy, Geissler, Olds & Lowe, P.C.

(57) ABSTRACT

A multi-diameter clipping mechanism includes an adhesive member, a connecting member, a first and a second clipping members, and an engaging member. The connecting member is connected to the adhesive member. The first clipping member has a guiding trough and a resilient arm. The second clipping member and the engaging member are assembled to the first clipping member. The second clipping member has an engaging tongue and unidirectionally inclined teeth. The engaging member has an engaging salient and a press portion at two ends thereof. When the second clipping member enters the guiding trough, one of the teeth engages with the engaging salient. When the press portion is pressed against the resilient arm by an external force, the engaging member pivots against the first clipping member to disengage the engaging salient from the tooth, thereby making the second clipping member leave the guiding trough.

9 Claims, 12 Drawing Sheets

(56) References Cited

U.S. PATENT DOCUMENTS

| | | | | |
|---|---|---|---|---|
| 6,742,223 B1* | 6/2004 | Chang | ................... | H02G 3/32 |
| | | | | 24/30.5 R |
| 8,584,324 B1* | 11/2013 | Shotey | ................ | F16L 3/1041 |
| | | | | 24/132 WL |
| 8,635,750 B1* | 1/2014 | Ginocchio | .............. | H02G 3/32 |
| | | | | 24/30.5 R |
| 8,756,767 B1* | 6/2014 | Baldwin | .............. | F16B 45/027 |
| | | | | 24/601.6 |
| 8,850,669 B1* | 10/2014 | Klein | ...................... | F16L 3/23 |
| | | | | 24/132 WL |
| 9,642,987 B2* | 5/2017 | Bierman | .............. | A61M 25/02 |
| 2005/0245906 A1 | 11/2005 | Makower et al. | | |
| 2009/0211063 A1* | 8/2009 | Ginocchio | ............... | F16B 2/10 |
| | | | | 24/270 |
| 2011/0259335 A1 | 10/2011 | Sullivan | | |

* cited by examiner

MULTI-DIAMETER CLIPPING MECHANISM

BACKGROUND OF THE INVENTION

1. Technical Field

The present invention relates to a clipping mechanism, and more particularly to a multi-diameter clipping mechanism adaptable to work with nasogastric tubes having various diameters.

2. Description of Related Art

With the development of medical technologies, significant breakthrough and evolution related to diagnosis and treatment of diseases have been made, comparatively leading to increased patient survival. However, coming with longevity is the increasingly demanding patient care. For patients with difficulty in self-feeding due to aging or other physiological conditions, nasogastric tubes are of great help as they allow convenient operations form medical staff and/or caregivers like sampling stomach contents of patients for examination and medicining patients in addition to feeding patients with water, liquid food, or nutritional supplements (e.g., milk).

When used for a patient, a normal nasogastric tube has its stomach-bound end passing through one nostril and placed in the stomach and has its exposed end left outside the body with a tubular connecting structure. These exposed parts are usually let hang down and tend to annoy the patient. For example, if the tube is inadvertently hooked when the patient turns his/her body or when a nursing operation is performed around the patient, it is likely that the tube undesirably moves and leaves its arranged position, and this can cause trouble, damage, or other harmful consequences to the patient.

To address the foregoing issue, fixtures for nasogastric tubes have been developed. For example, a prior-art device, as shown in FIG. 10 through FIG. 12, comprises an adhesive member 91, a connecting member 92, a first arm 93, a second arm 94, and a pivot 95. The adhesive member 91 has its one side provided with a connecting portion 911. The connecting member 92 is mounted on the connecting portion 911 of the adhesive member 91. The connecting member 92 has its one end provided with a threaded hole 921. The first arm 93 has its one end provided with a first arm piece 931, and has its opposite end provided with a resilient hook 932. An assembling space 933 is formed between the first arm piece 931 and the resilient hook 932, and a first pivot hole 934 communicates with the assembling space 933. The resilient hook 932 has its one surface facing the assembling space 933 provided with at least one engaging tooth 9321. The second arm 94 has its one end provided with a second arm piece 941, and has its opposite end provided with a pivot portion 942. The pivot portion 942 defines a second pivot hole 9421 passing therethrough. The pivot portion 942 has its outer edge provided with a plurality of unidirectionally inclined teeth 9422. The pivot portion 942 is inserted into the assembling space 933 of the first arm 93. The pivot 95 passing through the first pivot hole 934 of the first arm 93 and the second pivot hole 9421 of the second arm 94 is screwed into the threaded hole 921 of the connecting member 92 so that the first arm 93 and the second arm 94 are pivotally assembled and further combined with the connecting member 92.

In use, the adhesive member 91 is adhered to the nasal bridge of a patient. Then the nasogastric tube is placed between the first arm piece 931 of the first arm 93 and the second arm piece 941 of the second arm 94. Afterward, the first arm 93 is such operated that it comes toward the second arm 94. With the engagement between the engaging teeth 9321 of the resilient hook 932 of the first arm 93 and the unidirectionally inclined teeth 9422 of the pivot portion 942 of the second arm 94, the first arm piece 931 of the first arm 93 and the second arm piece 941 of the second arm 94 are restricted to stay close to each other, thereby holding the nasogastric tube therebetween.

With the existing fixture for a nasogastric tube, before the first arm piece 931 of the first arm 93 and the second arm piece 941 of the second arm 94 can be drawn apart, the resilient hook 932 has to be pull outward, so that the engaging teeth 9321 of the resilient hook 932 can separate from the unidirectionally inclined teeth 9422 of the pivot portion 942. Hence, the prior-art device is disadvantageous for its operation being inconvenient, and the resilient hook 932 is likely to be broken under the repeated pull operation.

SUMMARY OF THE INVENTION

To address the shortcomings of the conventional fixtures for nasogastric tubes, the inventor of the present invention has endeavored to make improvements by means of studying in various aspects, designing, modifying designs over and over, and conducting experiments on sample products, so as to eventually introduce the present invention.

The present invention provides a multi-diameter clipping mechanism, which comprises: an adhesive member, having an adhesive surface and a mount surface opposite to the adhesive surface, in which the adhesive surface is configured to be affixed to a nasal bridge of a patient in a reusable manner; a connecting member, having one end thereof connected to the mount surface of the adhesive member; a first clipping member, connected to the connecting member, the first clipping member being formed with a guiding trough at one side therethrough and being provided with a resilient arm that is near the guiding trough; a second clipping member, having one end thereof pivotally connected to an opposite side of the first clipping member, and having an opposite end thereof provided with an engaging tongue that has an outer edge provided with a plurality of unidirectionally inclined teeth; and an engaging member, pivotally connected to the side of the first clipping member that has the guiding trough and is opposite to the second clipping member, the engaging member having one end thereof provided with an engaging salient, and having an opposite end thereof provided with a press portion, in which when the second clipping member has entered the guiding trough by pivoting with respect to the first clipping member, one of the unidirectionally inclined teeth of the engaging tongue engages with the engaging salient, and when the press portion is pressed against the resilient arm by an external force, the engaging member pivots with respect to the first clipping member to disengage the engaging salient from the currently engaged unidirectionally inclined tooth of the engaging tongue, thereby making the second clipping member sway outward and leave the guiding trough.

With the configuration described above, the multi-diameter clipping mechanism of the present invention, opening the second clipping member with respect to the first clipping member can be easily achieved by pressing the press portion of the engaging member. As a result, the engaging member pivots with respect to the first clipping member, and thus tilts the engaging salient of the engaging member to disengage from the unidirectionally inclined tooth of the second clipping member, thereby allowing the second clipping member to sway out and leave the guiding trough. The mechanism is thus easy to operate and unlikely to break.

DETAILED DESCRIPTION OF THE INVENTION

Figure 1:
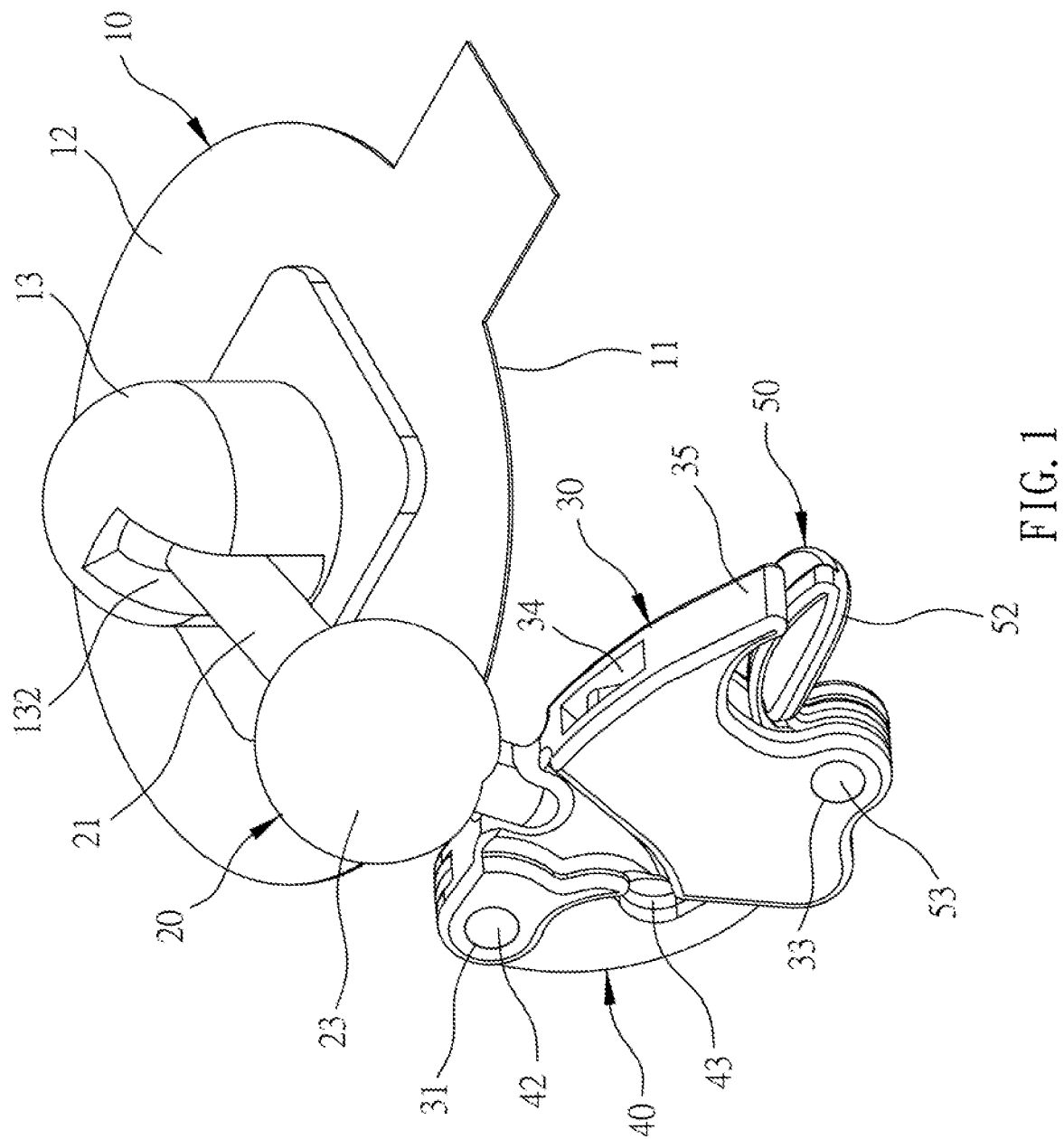
FIG. 1 is a perspective view of the present invention.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Referring to FIG. 1 through FIG. 9, the present invention provides a multi-diameter clipping mechanism, which comprises an adhesive member 10, a connecting member 20, a first clipping member 30, a second clipping member 40, and an engaging member 50, all of which will be detailed below.

Figure 2:
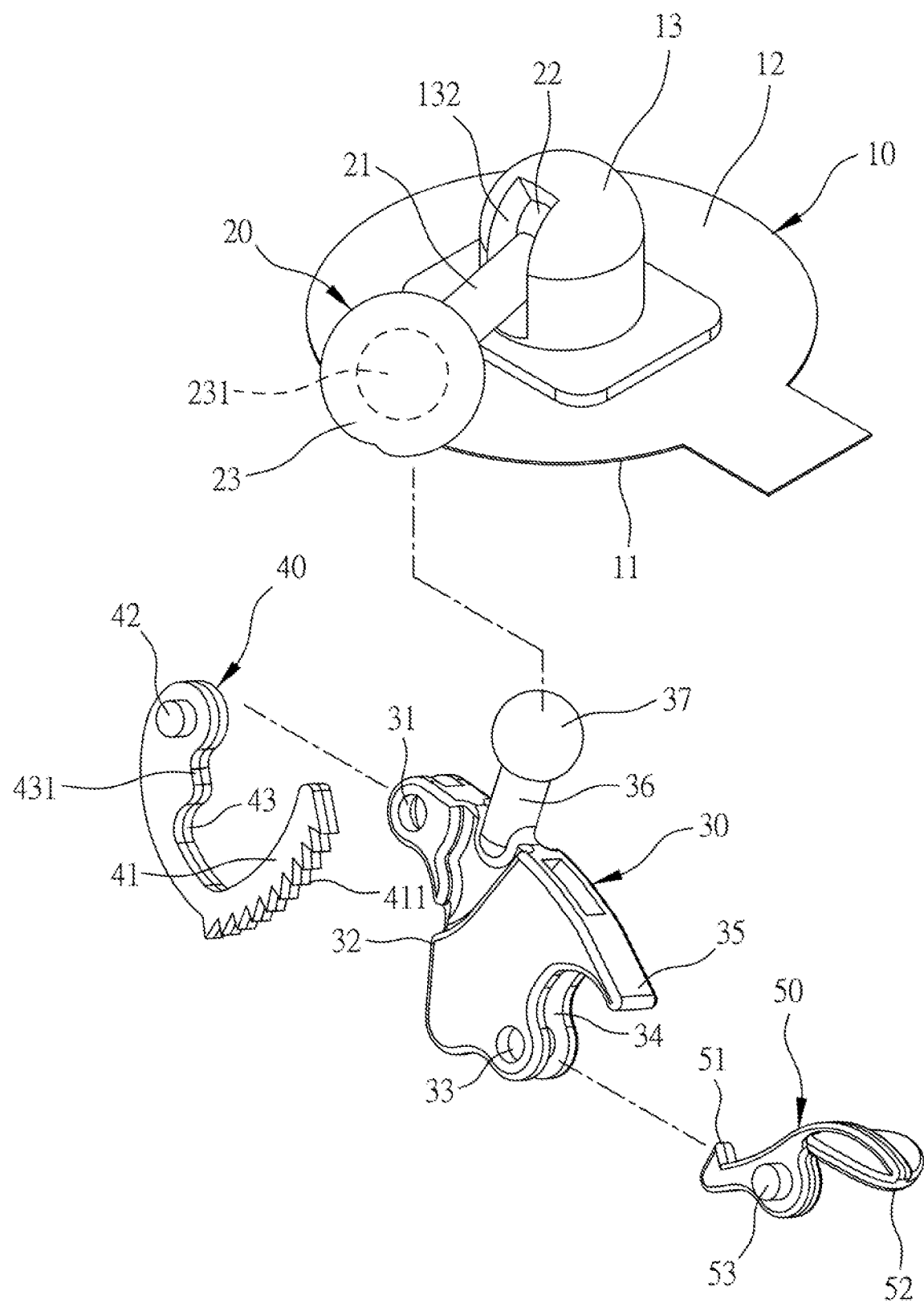
FIG. 2 is an exploded view of the present invention.
Figure 9:
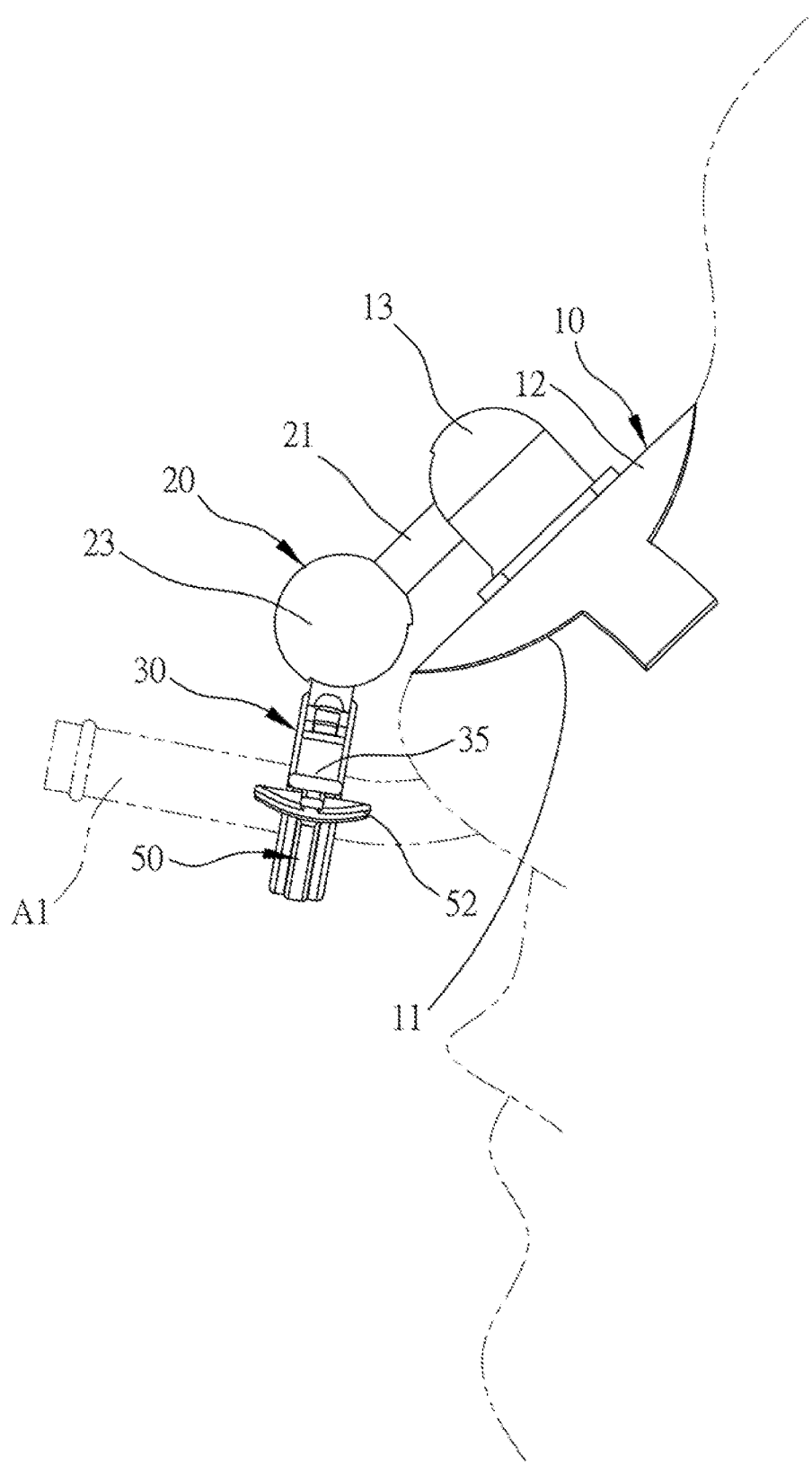
FIG. 9 is a side view showing the present invention in use.
Figure 10:
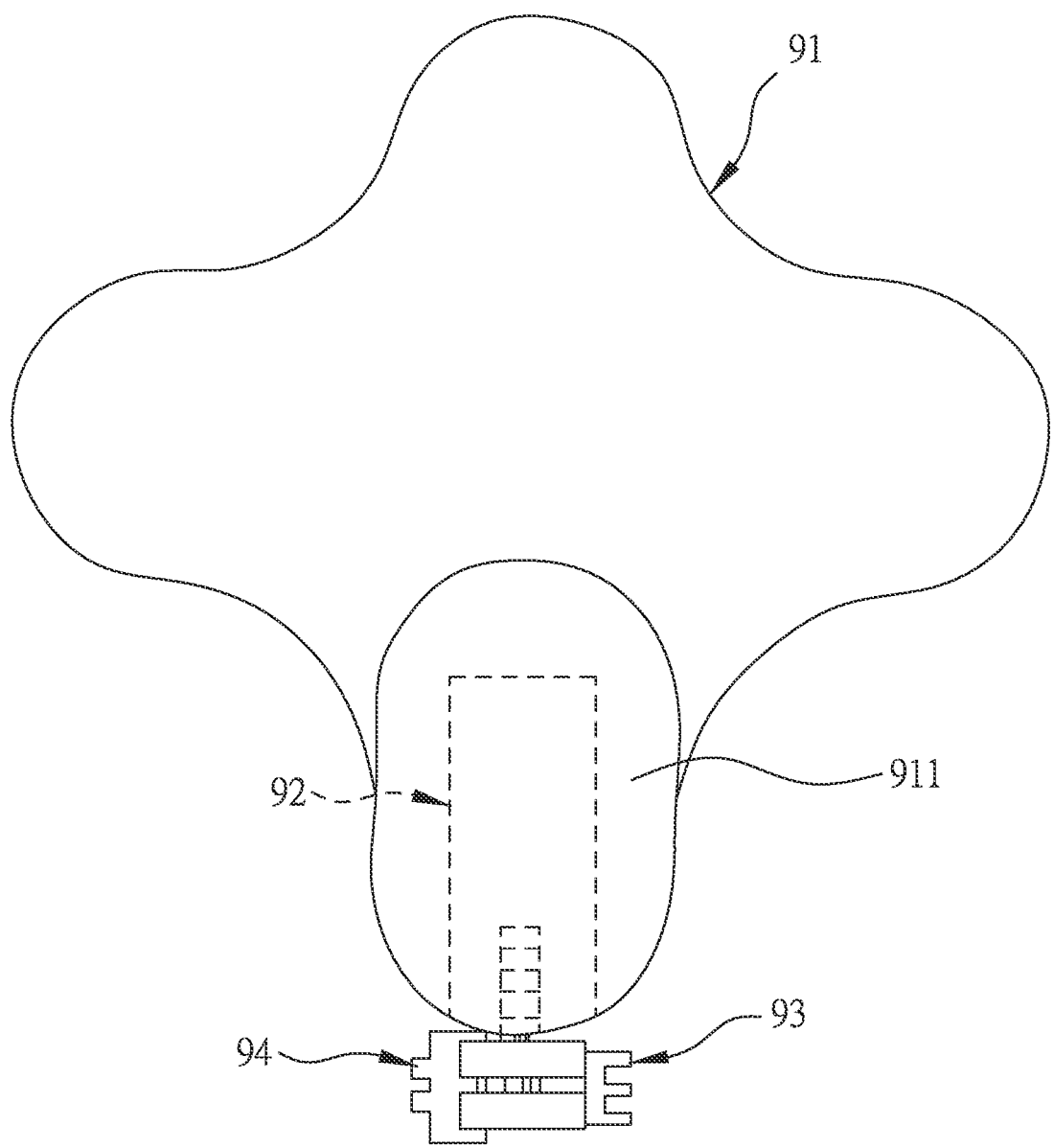
FIG. 10 is a top view of a prior-art device.
Figure 11:
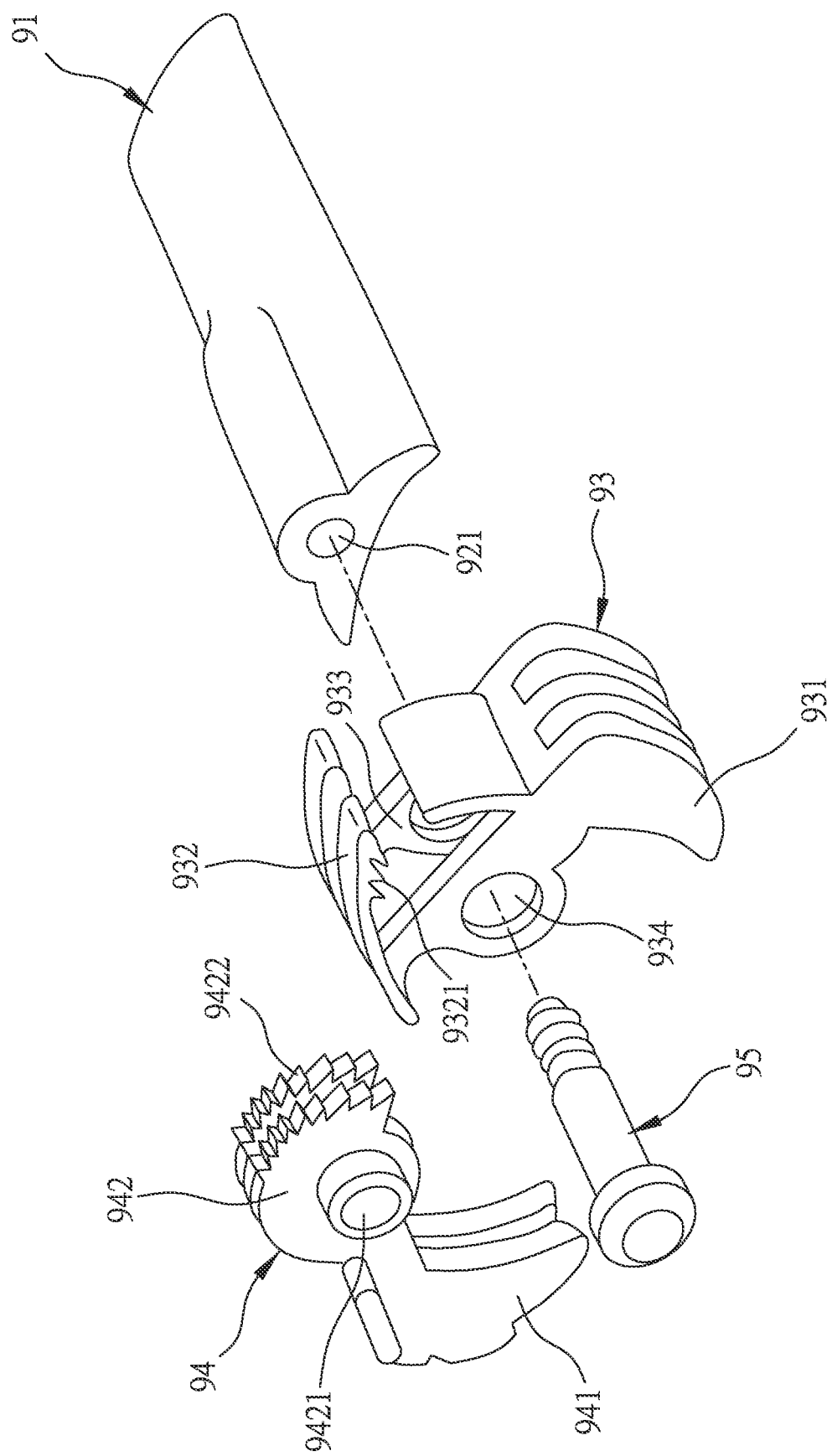
FIG. 11 is a partial, exploded view of the prior-art device.
Figure 12:
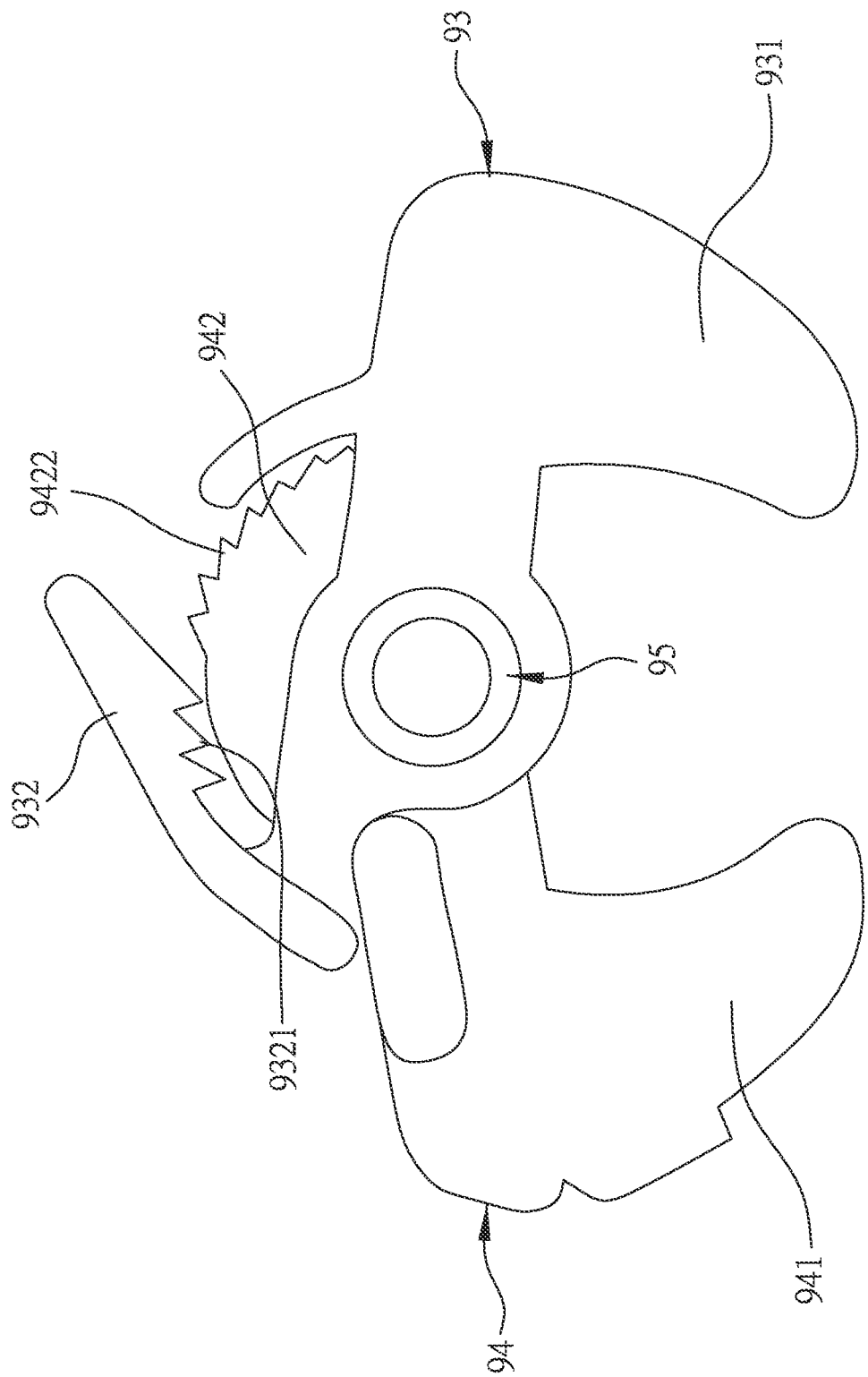
FIG. 12 is a partial, front view of the prior-art device.

The adhesive member 10 has an adhesive surface 11 and a mount surface 12 opposite to the adhesive surface 11. The adhesive surface 11 is configured to be affixed to the nasal bridge of a patient, as shown in FIG. 9, in a reusable manner. The mount surface 12 is provided with a pivot seat 13. The pivot seat 13 is located at the center of the mount surface 12 of the adhesive member 10, as shown in FIG. 1 and FIG. 2. In the present embodiment, the adhesive member 10 is generally a round piece, as shown in FIG. 1.

Figure 3:
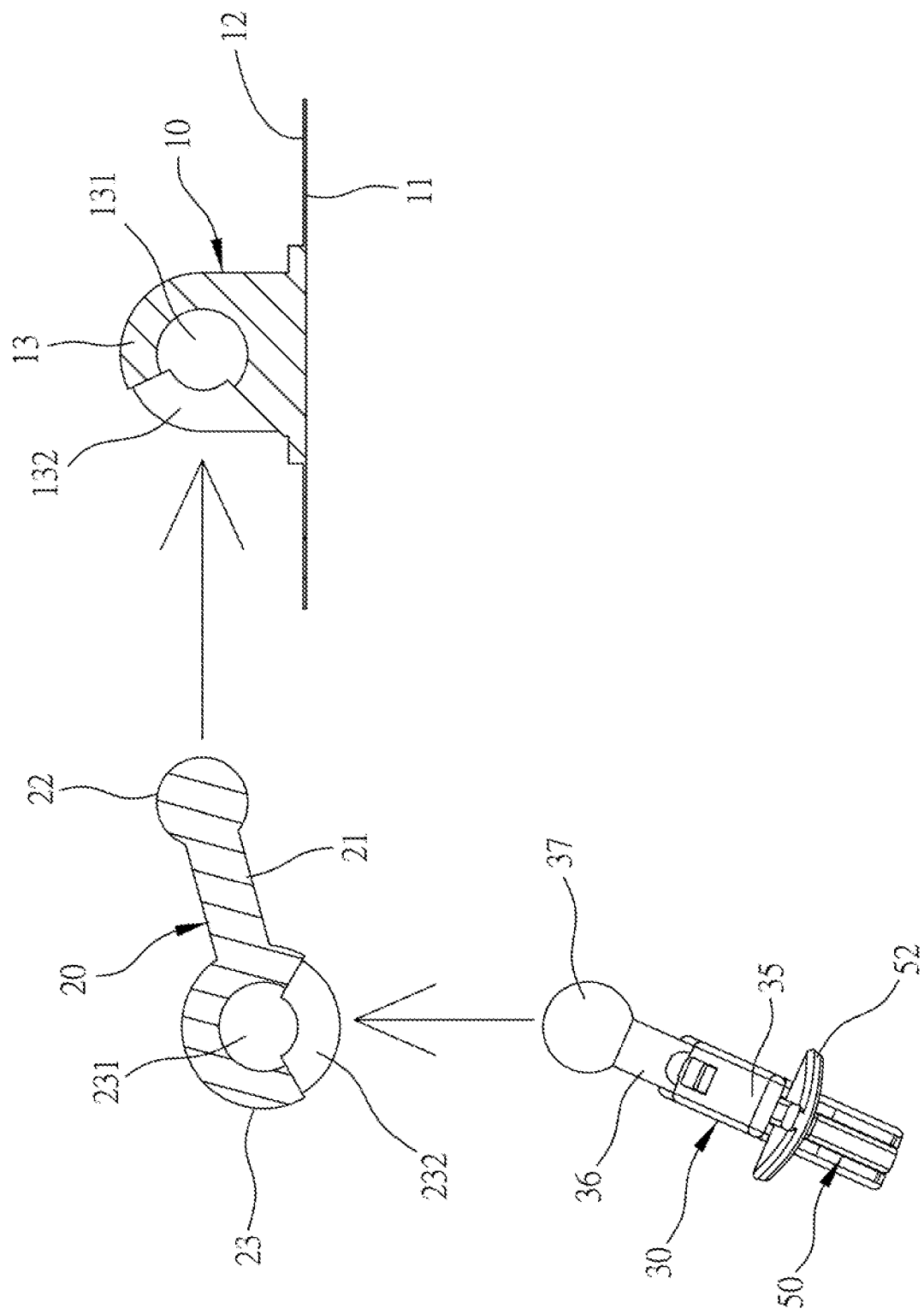
FIG. 3 is a schematic drawing illustrating assembling of the present invention.

Furthermore, the pivot seat 13 defines therein with a first spheroidal cavity 131. The first spheroidal cavity 131 is at its wall formed with a first slot 132 at one side, so that the first slot 132 communicates with the first spheroidal cavity 131, as shown in FIG. 3.

The connecting member 20 has its one end connected to the mount surface 12 of the adhesive member 10. The connecting member has a shaft 21. The shaft 21 has its one end provided with a first ball head 22, and has its opposite end provided with a connecting head 23. The first ball head 22 is rotatably received in the first spheroidal cavity 131 of the pivot seat 13, and the shaft 21 movably passes through the first slot 132 of the pivot seat 13, as shown in FIG. 2 and FIG. 3.

Moreover, the connecting head 23 defines therein a second spheroidal cavity 231. The second spheroidal cavity 231 is at its wall formed with a second slot 232 at one side, so that the second slot 232 communicates with the second spheroidal cavity 231, as shown in FIG. 3.

The first clipping member 30 is connected to the connecting member 20. The first clipping member 30 has its one side formed with a first pivot hole 31, and there is a first clipping surface 32 located near the first pivot hole 31. The first clipping member 30 has its opposite side formed with a second pivot hole 33 and a guiding trough 34. The first clipping member 30 further has a resilient arm located near the guiding trough 34.

Figure 4:
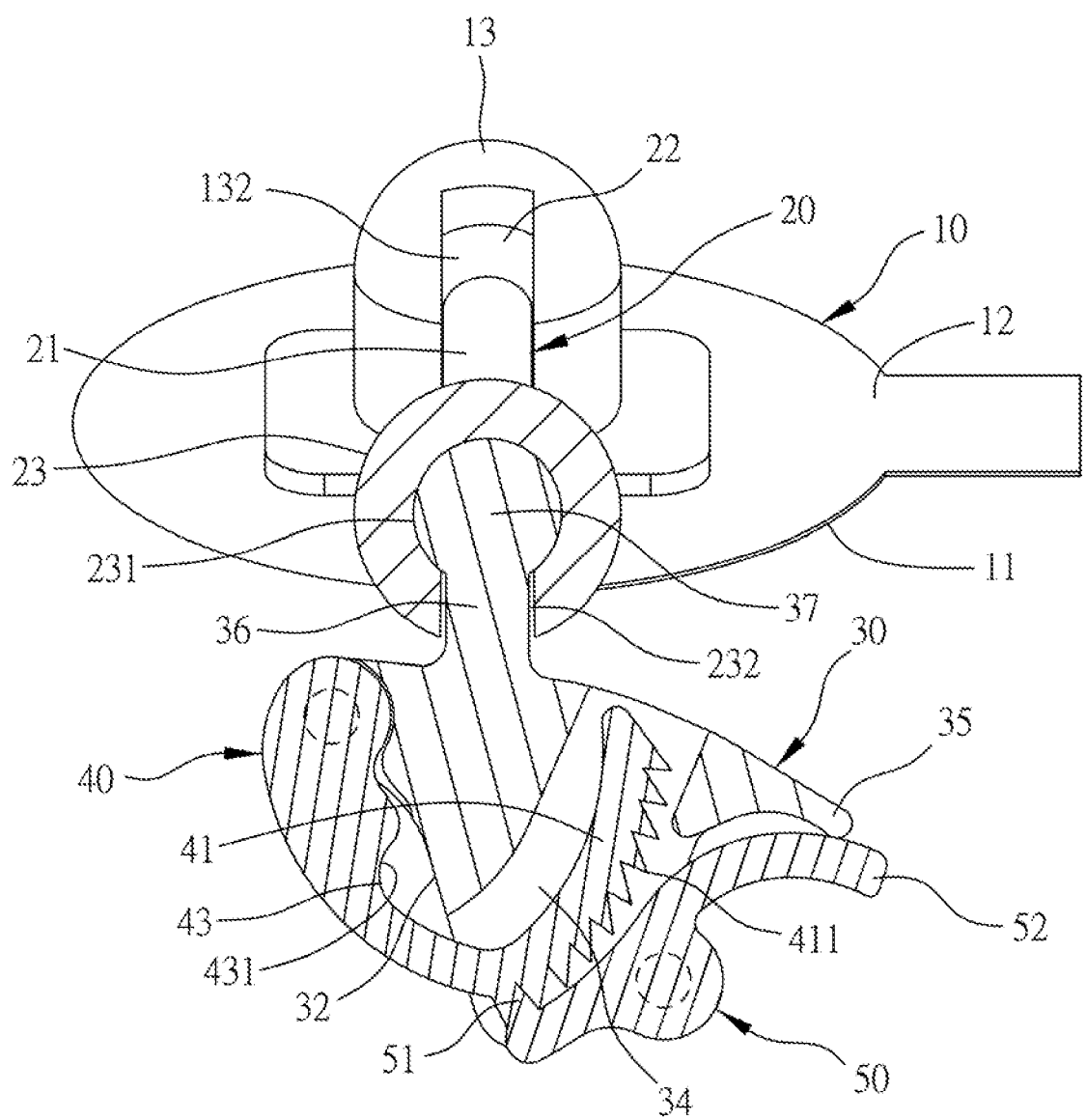
FIG. 4 is a cross-sectional view of the present invention.
Figure 5:
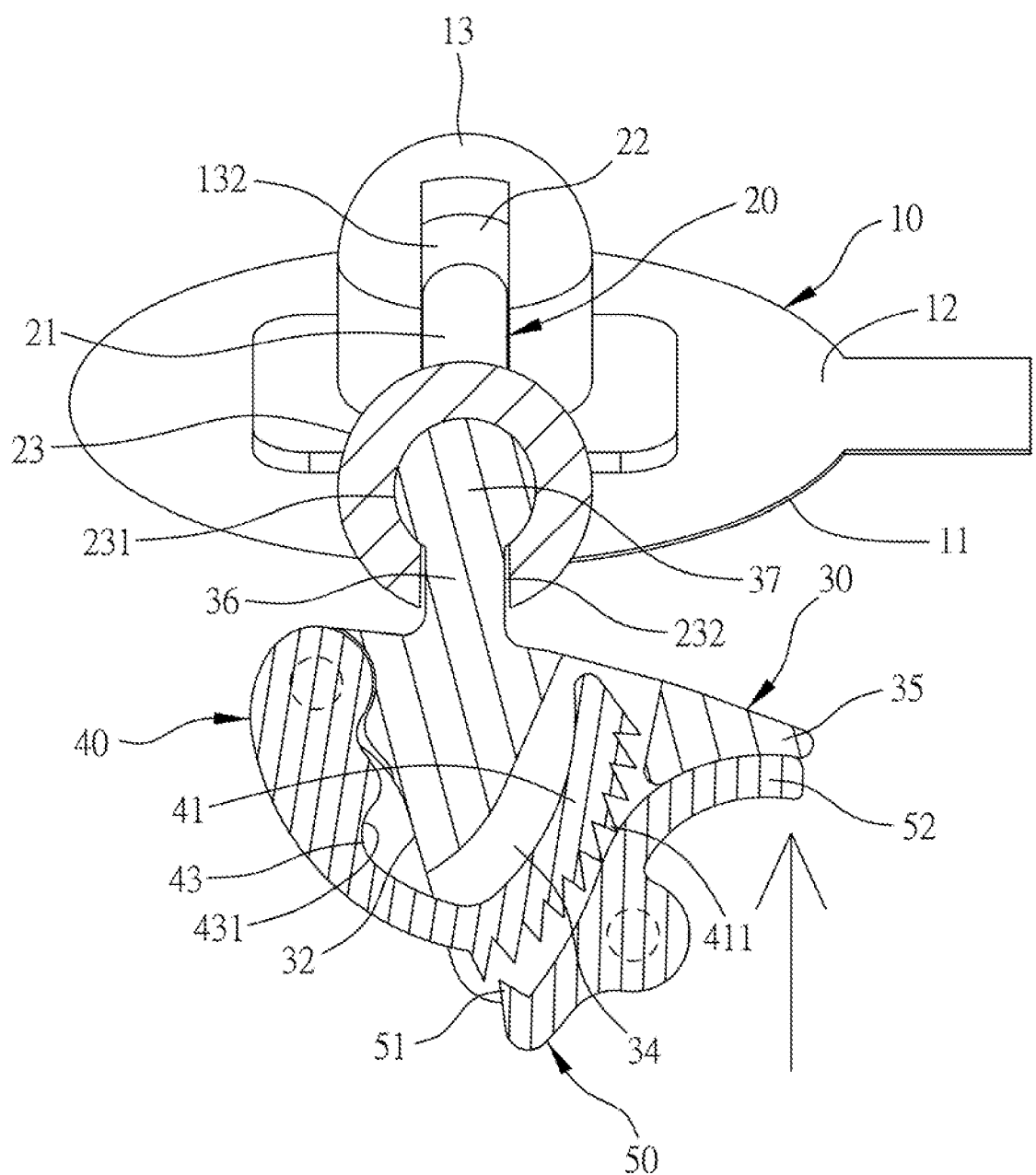
FIG. 5 is a first schematic drawing showing that the present invention holds a nasogastric tube.
Figure 6:
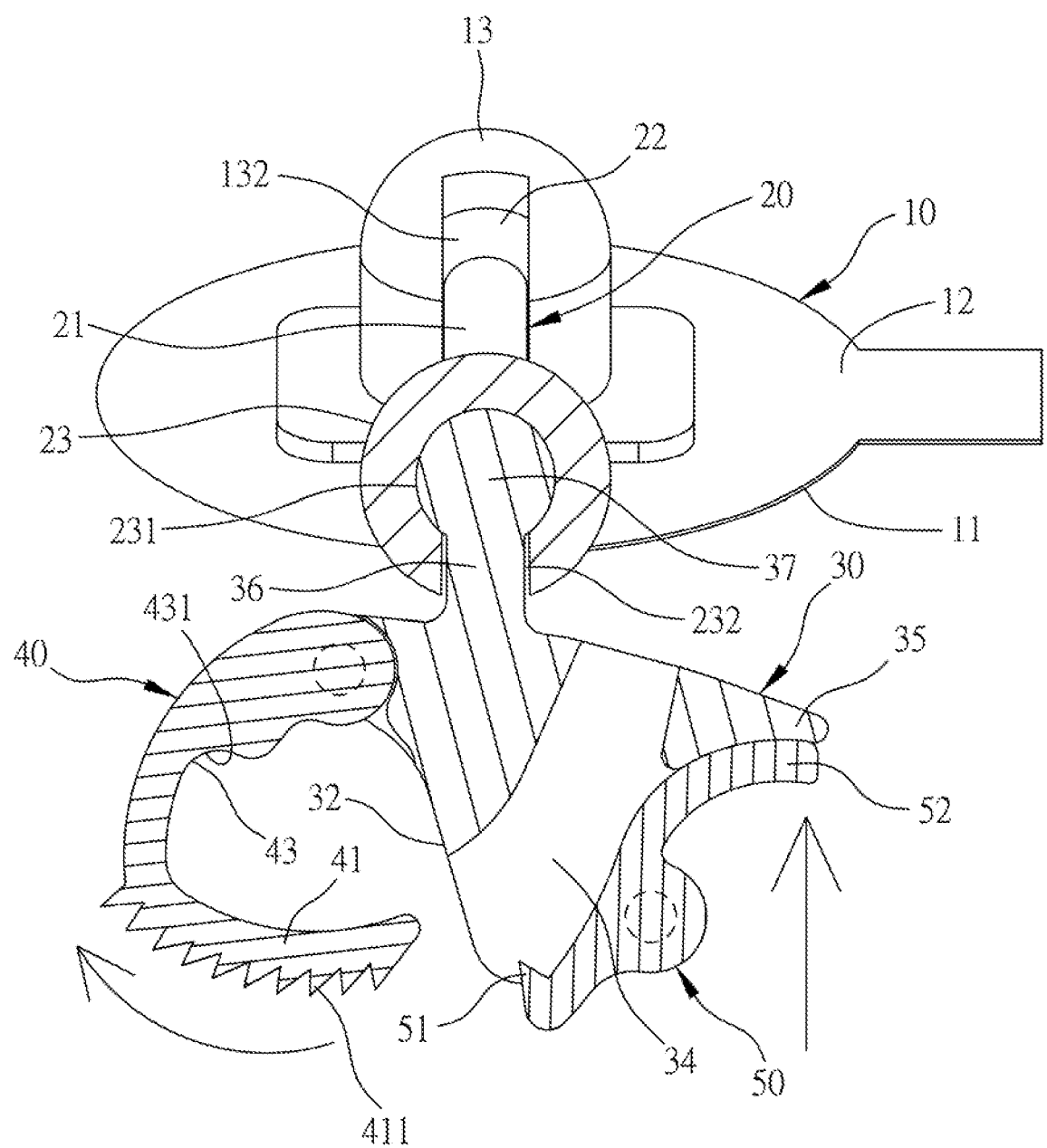
FIG. 6 is a second schematic drawing showing that the present invention holds the nasogastric tube.

Additionally, between the first pivot hole 31 and the resilient arm 35, there is a rod 36 extending outward. The rod 36 has its terminal provided with a second ball head 37. The second ball head 37 rotatably received in the second spheroidal cavity 231 of the connecting head 23, and the rod 36 moveably passes through the second slot 232 of the connecting head 23, as shown in FIG. 4 through FIG. 6.

The second clipping member 40 has its one end pivotally connected to one side of the first clipping member 30, and has its opposite end provided with an engaging tongue 41. In the present embodiment, the second clipping member 40 has a raised first pivot 42. The first pivot 42 is pivotally received in the first pivot hole 31 of the first clipping member 30, so that the second clipping member is pivotable with respect to the first clipping member 30. The engaging tongue 41 is configured to pivot in or out the guiding trough 34 of the first clipping member 30, as shown in FIG. 4 through FIG. 6.

Figure 8:
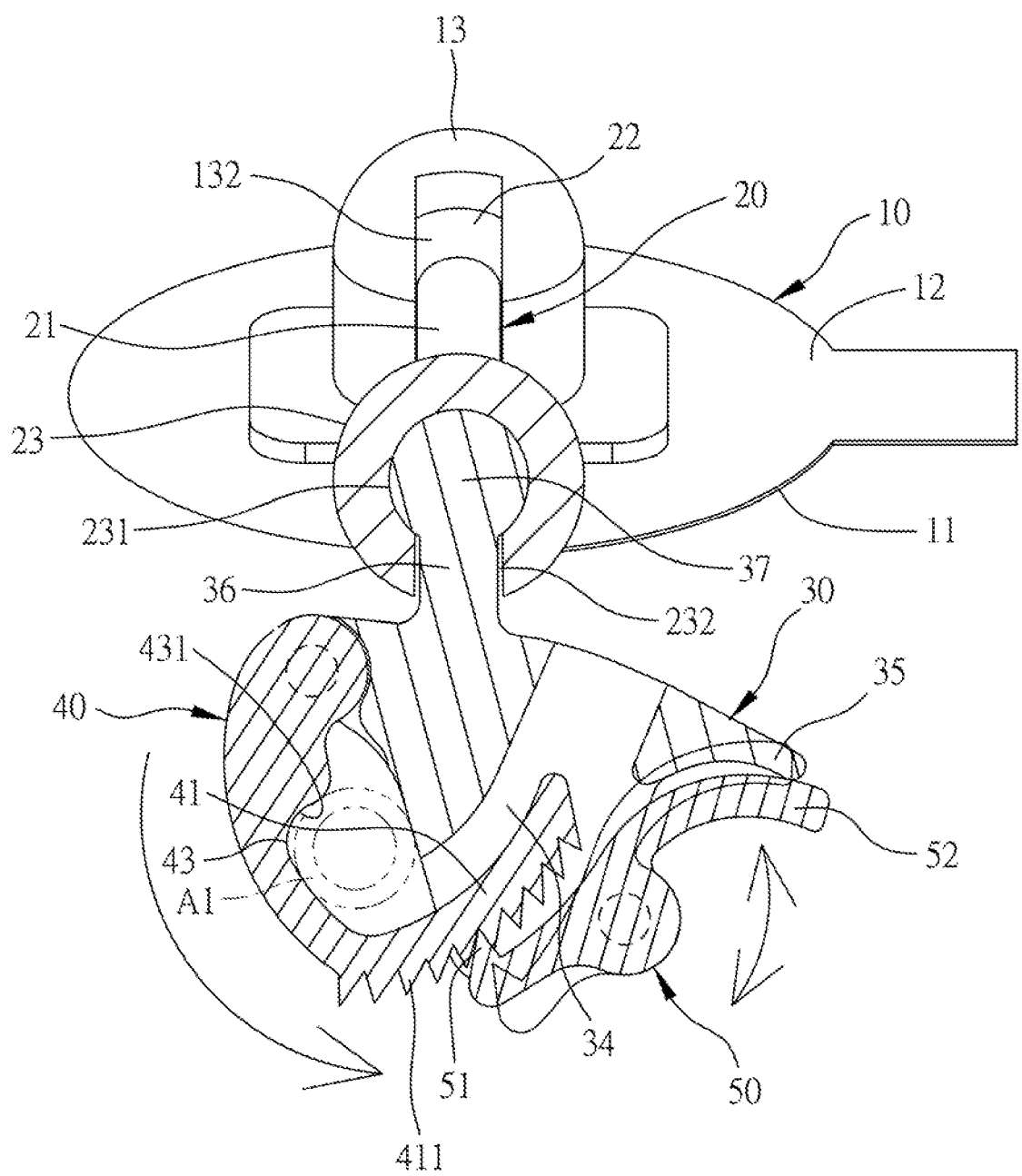
FIG. 8 is a fourth schematic drawing showing that the present invention holds the nasogastric tube.

Furthermore, the engaging tongue 41 has its out edge provided with a plurality of unidirectionally inclined teeth 411. Between the engaging tongue 41 and the first pivot 42, there is a second clipping surface 43. The second clipping surface 43 has a concave portion 431. Therein, when the second clipping member 40 has entered the guiding trough 34 by pivoting with respect to the first clipping member 30, the second clipping surface 43 faces the first clipping surface 32, so that the concave portion 431 of the second clipping surface 43 and the first clipping surface 32 work together to define a holding space therebetween. The holding space serves to tightly hold a nasogastric tube A1, thereby poisoning the nasogastric tube A1 between the first clipping surface 32 and the concave portion 431, as shown in FIG. 8.

The engaging member 50 is pivotally connected to the side of the first clipping member 30 opposite to the side of the clipping member 30 where the second clipping member 40 is connected. The engaging member 50 has its one end provided with an engaging salient 51, and has its opposite end provided with a press portion 52. Between the engaging salient 51 and the press portion 52, there is a raised second pivot 53. The second pivot 53 is pivotally received in the second pivot hole 33 of the first clipping member 30. When the second clipping member 40 has entered the guiding trough 34 by pivoting with respect to the first clipping member 30, one of the unidirectionally inclined teeth 411 of the engaging tongue 41 engages with the engaging salient 51. When the press portion 52 is driven by an external force applied thereon to press against the resilient arm 35, the engaging member 50 pivots with respect to the first clipping member 30, and makes the engaging salient 51 disengage from the unidirectionally inclined tooth 411 of the engaging tongue 41, so that the second clipping member 40 can sway out and leave the guiding trough 34.

It is to be noted that the engaging salient 51 is configured to engage with different unidirectionally inclined teeth 411, depending on the diameter of the nasogastric tube A1. Based on the orientation shown in FIG. 8, when the engaging salient 51 engages with an unidirectionally inclined tooth 411 closer to the lower left corner of the drawing, the diameter of the nasogastric tube A1 the multi-diameter clipping mechanism of the present invention accommodates is smaller. On the contrary, when the engaging salient 51 engages with an unidirectionally inclined tooth 411 closer to the upper right corner of the drawing, the diameter of the nasogastric tube A1 the multi-diameter clipping mechanism of the present invention accommodates is larger.

Without the presence of a nasogastric tube A1, the second clipping member 40 can engage with the engaging member 50 or separate from the first clipping member 30 to leave the disclosed multi-diameter clipping mechanism open. Referring to FIG. 4, in the depicted embodiment, without the presence of a nasogastric tube A1, the second clipping member 40 engages with the engaging member 50. In the example described below, the disclosed multi-diameter clipping mechanism in the initial state where it is not holding any nasogastric tube A1 has the second clipping member 40 engaging with the engaging member 50. Nevertheless, in other examples, the disclosed multi-diameter clipping mechanism in the initial state may have the second clipping member 40 not engaging with the engaging member 50.

Figure 7:
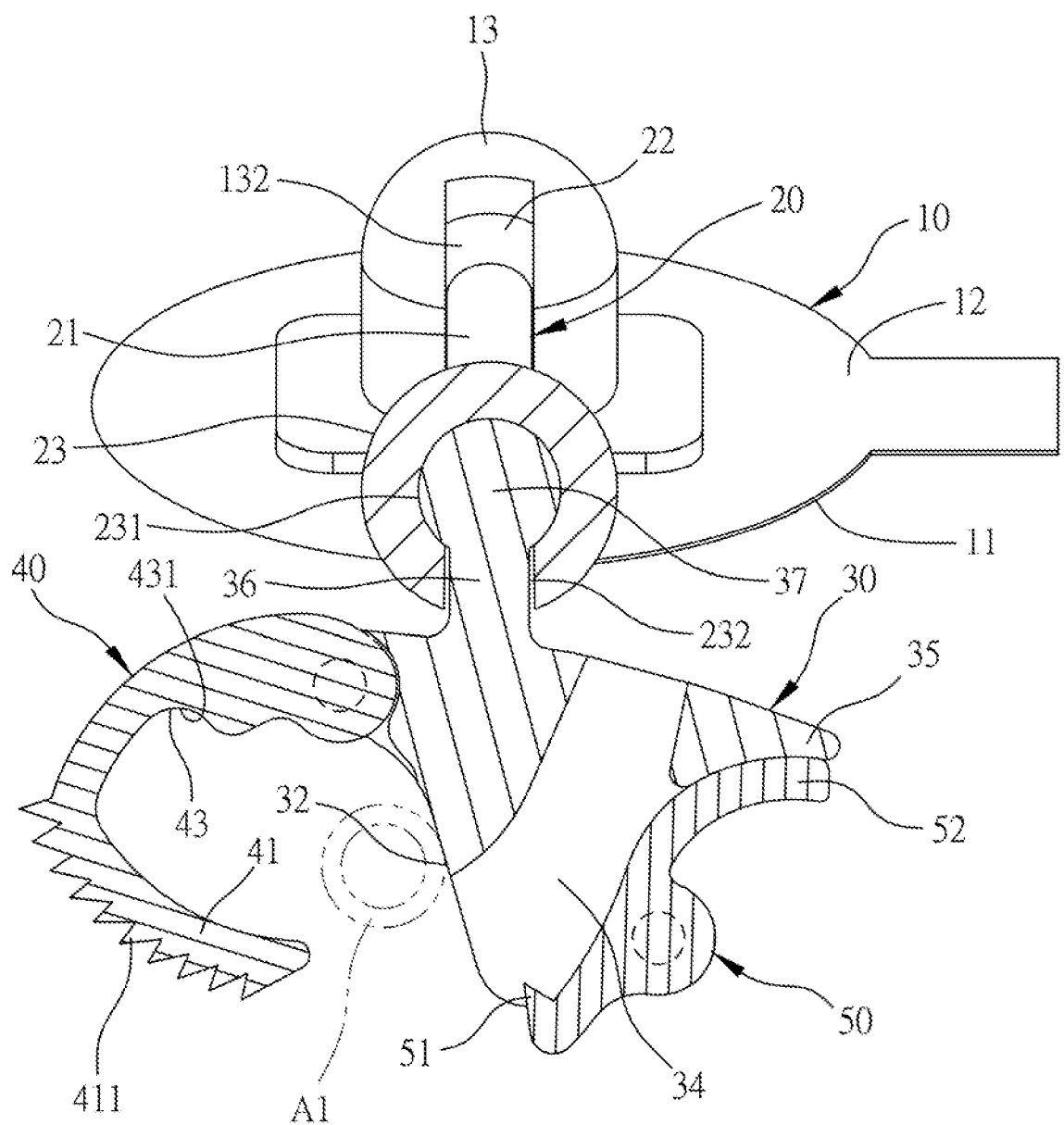
FIG. 7 is a third schematic drawing showing that the present invention holds the nasogastric tube.

Referring to FIG. 5 through FIG. 9, in order to hold a nasogastric tube A1 with the disclosed multi-diameter clipping mechanism, the adhesive surface 11 of the adhesive member 10 is first affixed to the nasal bridge of a patient. Then an external force is applied on to the press portion 52 of the engaging member 50 so that the press portion 52 presses against the resilient arm 35 of the first clipping member 30 (as shown in FIG. 5) to bend the resilient arm 35. The engaging member 50 pivots with respect to the first clipping member 30 and tilts the engaging salient 51 of the engaging member 50. This makes the engaging salient 51 release the unidirectionally inclined tooth 411 of the second clipping member 40, so the second clipping member 40 can sway outward and leave the guiding trough 34, making the second clipping member 40 and first clipping member 30 separate from each other (as shown in FIG. 6). At this time, a nasogastric tube A1 that has been inserted into the body of a patient can have its exposed end placed between the first clipping member 30 and the second clipping member 40 (as shown in FIG. 7). Afterward, the second clipping member 40 is operated to pivot on the first pivot 42 toward the guiding trough 34. The second clipping member 40 thus can enter the guiding trough 34 and come close to the first clipping member 30 (as shown in FIG. 8), so that the nasogastric tube A1 is positioned between the first clipping surface 32 and the concave portion 431 of the second clipping surface 43. Moreover, with the engagement between one of the unidirectionally inclined teeth 411 of the engaging tongue 41 and the engaging salient 51 of the engaging member 50, the second clipping member 40 is prevented from leaving the first clipping member 30.

Additionally, in virtue of the rotatable combination between the adhesive member 10 and the connecting member 20 or between the connecting member 20 and the first clipping member 30, the nasogastric tube A1 held by the first clipping member 30 and the second clipping member 40 can be further adjusted in terms of position and angle according to the shape of the nose of the patient, use preferences of the patient, etc.

With the configuration descried in relation to the previous specific embodiment, at least the following advantages can be achieved by the multi-diameter clipping mechanism of the present invention:

1. Opening the second clipping member 40 with respect to the first clipping member 30 can be easily achieved by pressing the press portion 52 of the engaging member 50. The pressed press portion 52 in turn presses against and thereby bends the resilient arm 35. As a result, the engaging member 50 pivots with respect to the first clipping member 30, and thus tilts the engaging salient 51 of the engaging member 50 to make the latter disengage from the unidirectionally inclined tooth 411 of the second clipping member 40, thereby allowing the second clipping member 40 to sway out and leave the guiding trough 34. At this time, the nasogastric tube A1 can be removed from the mechanism easily. The mechanism is thus easy to operate and unlikely to break.

2. In virtue of the rotatable combination between the adhesive member 10 and the connecting member 20 or between the connecting member 20 and the first clipping member 30, the nasogastric tube A1 can be freely adjusted in terms of position and angle, thereby avoiding pressure sore or ulcers around the nostril of the patient even after long-term use and providing comfortable use experience as well as practicality.

3. By engaging the engaging salient 51 with different unidirectionally inclined teeth 411, the holding space formed between the first clipping surface 32 and the second clipping surface 43 can be well adapted to nasogastric tubes A1 of various diameters, thereby increasing the applicability of the disclosed mechanism.

What is claimed is:

1. A multi-diameter clipping mechanism, comprising:
   an adhesive member, having an adhesive surface and a mount surface opposite to the adhesive surface, in which the adhesive surface is configured to be affixed to a nasal bridge of a patient in a reusable manner, the mount surface of the adhesive member is provided with a pivot seat;
   a connecting member, having one end thereof connected to the mount surface of the adhesive member, in which the connecting member has one end thereof provided with a first ball head, so that the first ball head is rotatably received in the pivot seat;
   a first clipping member, connected to the connecting member, the first clipping member being formed with a guiding trough at one side therethrough and being provided with a resilient arm that is near the guiding trough;
   a second clipping member, having one end thereof pivotally connected to an opposite side of the first clipping member, and having an opposite end thereof provided with an engaging tongue that has an outer edge provided with a plurality of unidirectionally inclined teeth; and
   an engaging member, pivotally connected to the side of the first clipping member that has the guiding trough and is opposite to the second clipping member, the engaging member having one end thereof provided with an engaging salient, and having an opposite end thereof provided with a press portion, in which when the second clipping member has entered the guiding trough by pivoting with respect to the first clipping member, one of the unidirectionally inclined teeth of the engaging tongue engages with the engaging salient, and when the press portion is pressed against the resilient arm by an external force, the engaging member pivots with respect to the first clipping member to disengage the engaging salient from the currently engaged unidirectionally inclined tooth, thereby making the second clipping member sway outward and leave the guiding trough.

2. The multi-diameter clipping mechanism of claim 1, wherein the first clipping member has two sides thereof provided with a first pivot hole and a second pivot hole, respectively; the second clipping member, at one end thereof opposite to the engaging tongue, being provided with a raised first pivot; and the engaging member being provided with a raised second pivot so that the second pivot is raised between the engaging salient and the press portion, in which the first pivot is pivotally received in the first pivot hole, and the second pivot is pivotally received in the second pivot hole.

3. The multi-diameter clipping mechanism of claim 2, wherein the connecting member has an end opposite to the first ball head provided with a connecting head, and a second ball head extends outward between the first pivot hole and the resilient arm, so that the second ball head is rotatably received in the connecting head.

4. The multi-diameter clipping mechanism of claim 2, wherein the pivot seat defines therein a first spheroidal cavity that has a wall formed with a first slot at one side thereof, so that the first slot communicates with the first spheroidal cavity, and the connecting member has a shaft, so that the first ball head is rotatably received in the first spheroidal cavity and the shaft moveably passes through the first slot.

5. The multi-diameter clipping mechanism of claim 3, wherein the connecting head defines therein a second spheroidal cavity that has a wall formed with a second slot at one side thereof, so that the second slot communicates with the second spheroidal cavity, and a rod terminated by the second ball head extends outward between the first pivot hole and the resilient arm, so that the second ball head is rotatably received in the second spheroidal cavity of the connecting head, and the rod moveably passes through the second slot.

6. The multi-diameter clipping mechanism of claim 2, wherein the first clipping member has one side thereof adjacent to the first pivot hole provided with a first clipping surface.

7. The multi-diameter clipping mechanism of claim 6, wherein the second clipping member is provided with a second clipping surface that is located between the engaging tongue and the first pivot, in which when the second clipping member has entered the guiding trough by pivoting with respect to the first clipping member, the second clipping surface faces the first clipping surface.

8. The multi-diameter clipping mechanism of claim 7, wherein the second clipping surface has a concave portion.

9. The multi-diameter clipping mechanism of claim 1, wherein the adhesive member is generally a round piece.

* * * * *